Mar. 13, 1923.

E. A. REEVES.
COMMINGLING DEVICE.
FILED MAR. 5, 1921.

1,448,151.

Inventor
Edwin A. Reeves
By
George E. Nay
Atty

Patented Mar. 13, 1923.

1,448,151

UNITED STATES PATENT OFFICE.

EDWIN A. REEVES, OF MILFORD, CONNECTICUT.

COMMINGLING DEVICE.

Application filed March 5, 1921. Serial No. 449,891.

*To all whom it may concern:*

Be it known that I, EDWIN A. REEVES, a citizen of the United States, residing at Milford, in the county of New Haven and State of Connecticut, have invented certain new and useful Improvements in Commingling Devices, of which the following is a specification, reference being had therein to the accompanying drawings.

My invention relates to new and useful improvements in commingling devices, having particular reference to a mechanism for automatically and thoroughly mixing the component parts of a fluid or fuel, either solid, liquid or gaseous, so that the same may be more homogeneous.

It is the object of this invention, among other things, to provide a device that will produce this result most efficiently, of universal application and composed of the fewest possible parts, so designed as to be practically indestructible, that will require little or no skill to install and can be maintained in perfect operative condition without attention.

To these and other ends my invention consists in the commingling device having certain details of construction and combinations of parts as will be hereinafter described, and more particularly pointed out in the claims.

Referring to the drawings in which like numerals of reference designate like parts in the several figures.

The improved device herein shown and described is particularly adapted for use with any mechanism employing a gaseous, fuel or fluid, either for burning as in an industrial furnace, or for explosive purposes, such as in an internal combustion engine, although not limited to such use or character of fuel or fluid. It is highly desirable that the component parts of the mixture should be as completely intermingled as is possible, thus producing a more efficient product and in some cases requiring a smaller proportion of some of such parts than otherwise.

In the form of the device shown herein it consists essentially of a plurality of tapered tubes 10 which are nested together, but alternately reversed in relation to each other. That is, the taper of a portion of the tubes is the reverse of the remainder thereof, in which condition they are preferably secured together. This produces a structure wherein at either face there are exposed the larger end of some of the tubes and the smaller end of the remaining tubes, and open spaces between the tubes.

The tubes are herein shown as being round in cross section, constructed of sheet metal and secured into a single unitary structure, but obviously a cast metal device or tubes angular in cross section will operate equally as well. I therefore do not desire to be limited to a construction wherein the parts are separately made and subsequently grouped.

Figure 1:
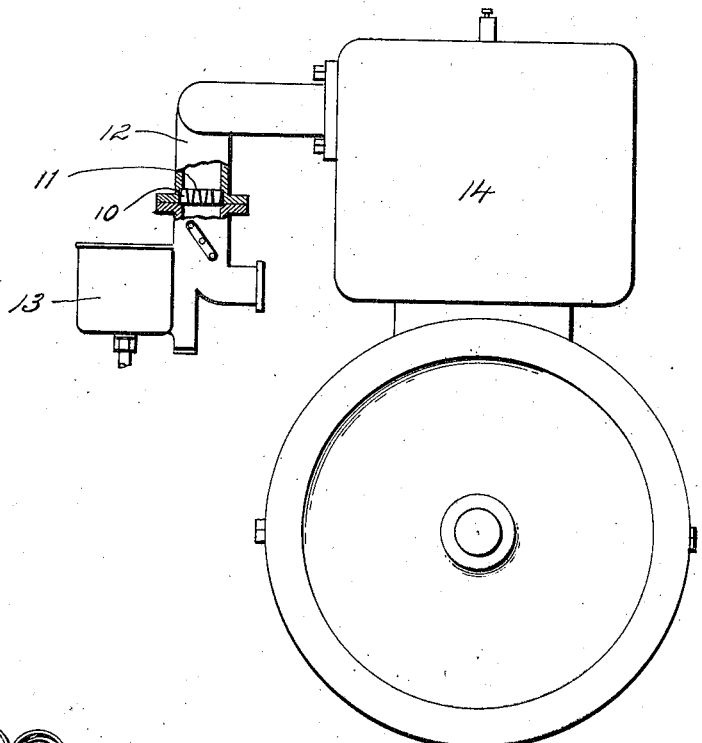
Figure 1 is a diagrammatic view of an internal combustion engine, the carburetor connected therewith and my improved device shown in one of its operative positions therebetween.
Figure 2:
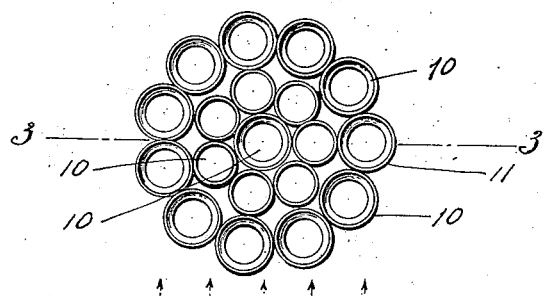
Figure 2 is an enlarged elevation of my improved device.
Figure 3:
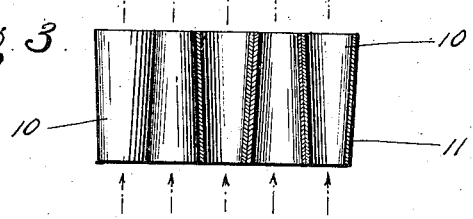
Figure 3 is a transverse sectional view thereof, taken upon line 3—3 of Figure 2.

My mechanism, designated by the numeral 11, in Figure 1 is illustrated as being installed in the connection 12 leading from the carburetor 13 to the cylinder 14 of the internal combustion engine therein shown. The internal combustion engine shown is only one of the many forms of engines to which the device may be attached and the shape and form of the carburetor is obvious and is entirely immaterial, so far as my invention is concerned.

If the mechanism is designed to be used for other purposes, such as with an industrial furnace, which it has not been considered essential to illustrate by drawings, as its structure is well known in the art, the connection 12 would lead to such furnace instead of to the engine as shown.

The fluid or fuel passes from the carburetor 13 in a single stream the cross-sectional area of which is substantially the same as the cross-sectional area of the interior of the connection 12. As this single stream engages my device 11, it is broken up into a plurality of smaller streams by passing through and between the tubes 10 and these streams are later united into a single stream before reaching the point of consumption. Some of the subdivided streams enter the tubes 10, having the larger ends exposed to the incoming fluid and others into such tubes as have the smaller ends exposed thereto, and the space therebetween. As a result, such of such streams as enter at the large ends increase their velocity while passing therethrough and those that enter the tubes at the smaller ends decrease their velocity, so that as these several streams leave the device, they are moving at different speeds, depending upon the area of the ports at the point of entrance.

The plurality of streams, after leaving the device 11, engage with each other and by reason of the varying speeds of movement thereof, exert an influence upon each other, the swift moving streams contacting with the slow moving streams and viceversa. The result is that a churning action takes place, the several streams being broken up by the influence of one upon the other and the molecules of the component parts are brought into a more intimate relation with each other and when the several subdivided streams again unite into a common stream, the mixture is much more homogeneous than when it first engaged the device 11. In this greatly improved condition, it is delivered at the point of consumption as a more efficient and economical mixture.

In the drawing I have shown the tubes 10 with their axis substantially parallel with each other, but they can be arranged, if so desired, at an angle to each other and to the length of the connection 12, thus giving the subdivided streams a whirling motion as well as varying its speed. This action in some cases facilitates the commingling operation.

As before indicated, the details of my invention may be very materially altered from those herein shown and I do not, therefore, limit myself to the exact construction herein shown and described, but claim all that falls fairly within the spirit and scope of the appended claims.

What I claim:

1. A fuel mixing device having a plurality of openings therethrough that vary in size from one end to the other and are arranged so that some of the small and large ends of said openings are at each end of said article, whereby a stream of fuel passing therethrough will be divided into a plurality of streams and the relative speed of said streams varied.

2. In combination with a device having a port therein of substantially uniform diameter; of a fuel mixing device mounted within said port and having a plurality of openings therethrough that vary in size from one end to the other and arranged so that some of the small and large ends of said openings are at each end of said article whereby a stream of fuel passing through said port is divided while passing therethrough into a plurality of streams and the relative speed thereof varied and after passing through said article are reunited into a common stream.

3. A fuel mixing device comprising a plurality of conical tubes grouped together with the larger ends of some of said tubes adjacent the smaller ends of the other of said tubes.

4. A fuel mixing device comprising a plurality of conical tubes grouped together with the larger ends of some of said tubes adjacent to the smaller ends of the other of said tubes and with open spaces therebetween, said tubes and spaces forming ports.

5. A fuel mixing device comprising a plurality of conical tubes grouped together with the larger ends of some of said tubes adjacent to the smaller ends of the other of said tubes and with open spaces therebetween, said tubes and spaces forming ports, the tubes being arranged in circles around a common center and all of the tubes in each of the circles having open ends of substantially the same diameter.

In testimony whereof, I have hereunto affixed my signature.

EDWIN A. REEVES.